United States Patent [19]

Okawauchi et al.

[11] Patent Number: 5,424,090
[45] Date of Patent: Jun. 13, 1995

[54] PROCESS OF MAKING A HARD BUTTER COMPOSITION CONTAINING AN ANTI-BLOOMING AGENT

[75] Inventors: Toshitaka Okawauchi, Sakai; Yoshikazu Kawata, Osaka; Yoshitaka Ebihara, Yao; Nobuo Sagi, Sakai; Norio Sawamura, Hashimoto, all of Japan

[73] Assignee: Fuji Oil Company, Limited, Osaka, Japan

[21] Appl. No.: 257,491

[22] Filed: Jun. 9, 1994

Related U.S. Application Data

[63] Continuation of Ser. No. 966,574, Oct. 26, 1992, abandoned, which is a continuation of Ser. No. 857,723, Mar. 26, 1992, abandoned, which is a continuation of Ser. No. 385,411, Jul. 26, 1989, abandoned.

[30] Foreign Application Priority Data

Aug. 5, 1988 [JP] Japan ................. 63-196420

[51] Int. Cl.⁶ .................. A23D 9/00; A23G 1/00
[52] U.S. Cl. ....................... 426/607; 426/610
[58] Field of Search ............ 426/601, 607, 610, 633, 426/660

[56] References Cited

U.S. PATENT DOCUMENTS

| | | | |
|---|---|---|---|
| 3,492,130 | 1/1970 | Harwood | 99/118 |
| 4,268,527 | 5/1981 | Matsuo et al. | 426/33 |
| 4,726,959 | 2/1988 | Momura et al. | 426/607 |
| 4,839,192 | 6/1989 | Sagi et al. | 426/607 |
| 4,855,152 | 8/1989 | Nakano | 426/610 |
| 4,877,636 | 10/1989 | Koyano | 426/610 |

FOREIGN PATENT DOCUMENTS

| | | |
|---|---|---|
| 188122 | 7/1986 | European Pat. Off. |
| 0209327 | 1/1987 | European Pat. Off. |
| 237307 | 9/1987 | European Pat. Off. |
| 2178146 | 11/1973 | France |
| 1431781 | 4/1976 | United Kingdom |

OTHER PUBLICATIONS

TIMMS, "Phase Behaviour of Fats and Their Mixtures", *Prog. Lipid Res.*, vol. 23, pp. 1-38, 1984, Great Britain.

GUNSTONE et al., "*The Lipid Handbook*", p. 123.

*Primary Examiner*—Carolyn Paden
*Attorney, Agent, or Firm*—Wenderoth, Lind & Ponack

[57] ABSTRACT

An anti-blooming agent which comprises not less than 20% by weight of mono-U-di-S glycerides (SSU) wherein U is a fatty acid residue having a melting point as the corresponding free fatty acid of not higher than 40° C. and bonded to the 1- or 3-position of the glyceride, and S is a saturated fatty acid residue having a melting point of not lower than 45° C. and bonded to the remaining positions, and not less than 75% by weight of all S in said SSU being stearic acid residue or palmitic acid residue. The production of hard butter and a hard butter product such as chocolate using the anti-blooming agent is also disclosed.

6 Claims, No Drawings

PROCESS OF MAKING A HARD BUTTER COMPOSITION CONTAINING AN ANTI-BLOOMING AGENT

This application is a continuation of now abandoned application, Ser. No. 07/966,574, filed Oct. 26, 1992, now abandoned, which is a continuation of now abandoned application, Ser. No. 07/857,723, filed Mar. 26, 1992, now abandoned, which is a continuation of now abandoned application, Ser. No. 07/385,411, filed Jul. 26, 1989, now abandoned.

FIELD OF INVENTION

The present invention relates to an anti-blooming agent and a process for producing a hard butter or hard butter product by using it.

BACKGROUND OF THE INVENTION

In the production of a product using a hard butter in a broad sense including cacao butter, for example, chocolate, it has been desired to prevent or to delay fat blooming. For this purpose, various methods have been proposed. Examples thereof include a method comprising adding a certain anti-blooming agent, a method for improving a hard butter itself and a method comprising carrying out a special physical treatment, particularly, heat treatment. As the anti-blooming agent, in addition to chemical substances other than triglycerides such as glyceryl monostearate, sorbitan monostearate and polyoxyethylene sorbitan monostearate, for example, there have been known specific triglyceride compositions other than cacao butter such as a triglyceride composition containing 20 to 60% by weight of a saturated fatty acid having 22 carbon atoms as a constituent fatty acid [Japanese Patent Kokai No. 58-198245 (WPI Acc. No. 84-002817/01)], a triglyceride composition containing 15 to 70% by weight of fatty acids having 20 to 24 carbon atoms and 20 to 60% by weight of unsaturated fatty acids having 16 to 20 carbon atoms as constituent fatty acids (U.S. Pat. No. 4,726,959) and the like.

However, in some countries, the use of chemical substances other than triglycerides is legally limited. Further, in the case that a certain triglyceride composition is used, although anti-blooming effect can be obtained, sometimes, other properties are deteriorated. For example, in the case of the above triglyceride compositions containing long-chain fatty acids as constituent fatty acids [Japanese Patent Kokai No. 58-198245 (WPI Acc. No. 84-002817/01) and U.S. Pat. No. 4,726,959), there is a problem such as deterioration of the melting property of a hard butter product in the mouth, or the viscosity of a hard butter mix is raised during tempering, which results in deterioration of workability.

OBJECTS OF THE INVENTION

One object of the present invention is to provide an anti-blooming agent which is a glyceride composition and can prevent fat blooming without deterioration of melting in the mouth and workability.

Another object of the present invention is to provide a process for producing a hard butter such as a cacao butter substitute by using the glyceride composition.

Still another object of the present invention is to provide a process for producing a hard butter product such as chocolate by using the glyceride composition or the hard butter.

These objects as well as other objects and advantages of the present invention will become apparent to those skilled in the art from the following description.

SUMMARY OF THE INVENTION

According to the present invention, there is provided an anti-blooming agent which comprises not less than 20% by weight of mono-U-di-S glycerides (SSU) wherein U is a fatty acid residue having a melting point as the corresponding free fatty acid of not higher than 40° C. and bonded to the 1- or 3-position of the glyceride, and S is a saturated fatty acid residue having a melting point of not lower than 45° C. and bonded to the remaining positions, and not less than 75% by weight of all S in said SSU being a stearic acid residue or palmitic acid residue.

The present invention also provide a process for producing a hard butter which comprises admixing the above anti-blooming agent with other raw materials for the hard butter to raise the SSU content of the hard butter by not less than 2.0% by weight, and a process for producing a hard butter product which comprises admixing the above anti-blooming agent or a hard butter containing it with other raw materials for the hard butter to raise the SSU content in the fat component of the hard butter product by not less than 1.2% by weight.

DETAILED DESCRIPTION OF THE INVENTION

The anti-blooming agent of the present invention is a triglyceride type anti-blooming agent and at least 20% by weight of the triglycerides is SSU glycerides.

Examples of the fatty acid residue represented by "U" include fatty acid residues having 16 or more carbon atoms and one or more unsaturated bonds such as those of oleic acid, linoleic acid, linolenic acid and the like. Further, the residue "U" includes saturated fatty acid residues having 10 or less but, preferably, not less than 4 carbon atoms such as those of caproic,tic acid, caprilic acid, caproic acid, butyric acid and the like. The fatty acid residue represented by "S" may be long-chain fatty acid residues having 20 or more carbon atoms such as residues of arachidinic acid and behenic acid, or mid-chain fatty acid residues such as residues of myristic acid and lauric acid. However, 75% by weight or more, preferably, 80% by weight or more of all "S" in SSU should be residues of palmitic acid and/or stearic acid. When the amount of palmitic acid residue and/or stearic acid residue is smaller than the above range and the amount of long-chain fatty acid residues becomes larger, melting in the mouth is deteriorated and workability is also deteriorated due to a high viscosity during tempering. These problems are particularly notable in the production of a product using a tempering type hard butter, that is, a hard butter product composed of, as the main component, 2-unsaturated-1,3-disaturated glycerides (particularly a hard butter product containing a large amount of StOSt or STOP). Further, when the amount of palmitic acid residue and/or stearic acid residue is small and the amount or, mid-chain fatty acid residue is large, soapy flavor results in the case that the mid-chain fatty acid is lauric acid. In the case that the mid-chain fatty acid is myristic acid, the cost for the raw materials becomes expensive.

For improving anti-blooming properties of a hard butter product by admixing the anti-blooming agent, in general, when the SSU content in the agent becomes larger, the amount of the agent to be admixed becomes smaller. To the contrary, when the SSU content in the agent becomes smaller, a larger amount of the agent should be admixed. However, the SSU content in the agent should be not less than 20% by weight, preferably 40% by weight or more. When this content is too small, the SSU content of a hard butter product can not be efficiently raised, and the effect of addition of the anti-blooming agent is scarcely expected. Further, the quality of a hard butter product is sometimes deteriorated depending upon components other than SSU. Preferably, the amount of trisaturated glycerides in the anti-blooming agent is not more than 20% by weight and the total amount of monosaturated-diunsaturated glycerides and triunsaturated glycerides is not more than 50% by weight More preferably, the amount of trisaturated glycerides is not more than 10% by weight, and the total amount of monosaturated-diunsaturated glycerides and triunsaturated glycerides is not more than 30% by weight. When the amount of trisaturated glycerides is larger, workability is liable to be deteriorated because an increase in viscosity during tempering and, when the total amount of monosaturated-diunsaturated glycerides and triunsaturated glycerides is too large, the product is liable to have a sticky mouth feel.

The anti-blooming agent can be obtained by fractionation and concentration of natural fats and oils according to the conventional method. Alternatively and preferably, it can be efficiently produced by interesterification as described hereinafter.

That is, the anti-blooming agent can be obtained by using as one of the raw materials a fat or oil wherein the iodine value (I.V.) thereof is decreased as low as possible by hydrogenation, typically, a so-called extremely hydrogenated fat, or a high melting point fraction obtained by fractionation of a fat or oil (preferably, a fat or oil having I.V. of not more than 10), subjecting the raw material to interesterification with a fat or oil, a fatty acid or a fatty acid lower alcohol ester being rich in U, and, if necessary, removing components other than SSU by fractionation or molecular distillation from the resulting reaction product.

The interesterification can be carried out according to a non-selective method such as that using an alkaline metal catalyst such as sodium methylate, or an enzymatic selective method using lipase or a lipase preparation which has selectivity to the 1- and 3-positions of triglycerides [for example, U.S. Pat. Nos. 4,275,081, 4,268,527, 4,275,011, 4,472,503, and 4,420,560, Japanese Patent Kokai No. 57-78496 (WPI Acc. No. 82-51422E), EP-064855, WO 8303844 and EP-126416]. In order to increase the yield of SSU with a lower yield of SUS, the latter selective interesterification is superior to the former non-selective method. However, even by the former non-selective method, an interesterified product having the ratio of SUS to SSU of about 1:2 can be obtained. Therefore, the anti-blooming agent obtained by either interesterification can be used without any difficulty. Fractionation can be carried out by, for example, a method wherein an organic solvent such as hexane or acetone is used, a method wherein an aqueous solution of a surfactant is used, or a dry fractionation method. When there is a considerable difference between molecular weights of triglycerides, molecular distillation or the like can be preferably employed.

According to the process of the present invention, a hard butter or a hard butter product can be produced by admixing and kneading the anti-blooming agent with other conventional raw materials uniformly and, if necessary, subjecting the mixture to tempering according to the conventional method.

For example, the anti-blooming agent can be used by melting it together with other raw fats and oils. Alternatively, it can be used as it is or it can be used as a raw fat or oil by melting it in another raw fat or oil such as cacao butter or another hard butter. The amount of the anti-blooming agent to be added is such that the SSU content in the hard butter is at least 2.0% by weight, preferably, 4 to 25% by weight, more preferably, 6 to 25% by weight higher than that obtained without addition thereof, or the SSU content in the fat component of a hard butter product is at least 1.2% by weight, preferably, 2.5 to 7.5% by weight, more preferably, 3.5 to 7.5% by weight higher than that obtained without addition thereof. When the increment of the SSU content is too small, the effect for improving blooming resistance of a hard butter product is scarcely expected. On the other hand, when the increment of the SSU content becomes higher, blooming resistance is more improved. However, when it becomes too high, workability is lowered in the case of the production of tempering type chocolate.

Commercially available tempering type hard butter also contains SSU in a small amount such as less than about 2% by weight and the fat component of chocolate using it contains less than about 0.5% by weight of SSU. When the anti-blooming agent of the present invention is used, the preferred amount of SSU in a hard butter is 6 to 27% by weight and that in a hard butter product is 3 to 8% by weight.

The mechanism of improvement of bloom resistance by increase in SSU content is not fully clarified. However, according to the present inventors' experiment, it has been confirmed that the transformation of fat crystals after formation of $\beta$ crystals is considerably delayed by addition of the anti-blooming agent of the present invention.

That is, cacao butter or that containing the anti-blooming agent of the present invention in such an amount that the SSU content was raised by 16% by weight was melted and a sample thereof was rapidly cooled to 0° C. and stored at 20° C. for 24 hours to form $\beta$ fat crystals. This was allowed to stand at 17° C. for 11.5 hours and then at 32.5° C. for 11.5 hours. This cycle was repeated, and changes in the ratio of intensity of the peak of $\beta_1$ form (VI crystal form, 3.65 Å) to that of $\beta_2$ form (V crystal form, 4.00 Å) of the X ray diffraction pattern (and increment thereof) were observed. The following results are obtained.

| Lapse of time | 16 hours | 4 months | 7 months |
| --- | --- | --- | --- |
| Cacao butter containing anti-blooming agent | 0.67 (0.00) | 0.91 (0.36) | 1.06 (0.59) |
| Cacao butter | 0.84 (0.00) | 1.28 (0.53) | 1.63 (0.94) |

The numbers in the parentheses are increments of the ratio.

As seen from the results, the addition of the anti-blooming agent decreases transformation (the above increment) from $\beta_2$ to $\beta_1$ by about 50% in comparison with cacao butter containing no anti-blooming agent. It is considered that this must prevent formation of coarse fat crystals, which results in prevention of fat blooming.

Further, in the case of the anti-blooming agent wherein more than one half of SSU is StStO (St is stearic acid and O is oleic acid), SSU content in a hard butter is raised by about 6.0% by weight or more, or that in a raw fat material of a hard butter product is raised by about 3.5% by weight or more due to addition of the anti-blooming agent. Thereby, anti-blooming effect at about 34° to 35° C. which has been never obtained can be obtained.

In the present invention, the term "hard butter product" means a product obtained by using a hard butter including cacao butter. Examples thereof include chocolate, white chocolate wherein a small amount or no cacao butter is used, coating chocolate and the like.

The term "hard butter" includes a so-called tempering hard butter and a non-tempering hard butter such as a high elaidic hard butter.

As described above, the anti-blooming agent of the present invention is effective for preventing fat blooming without deterioration of melting in the mouth and workability, and, particularly, it is very useful for producing a hard butter product such as chocolate.

The following Examples and Comparative Examples further illustrate the present invention in detail but are not to be construed to limit the scope thereof. All "parts" and "%'s" are by weight unless otherwise stated.

EXAMPLE 1

A mixture of the same amounts of a fat obtained by extremely hydrogenated soy bean oil (I.V.: 0.59) and high oleic sunflower oil was subjected to interesterification in the presence of sodium methylate as a catalyst at 80° C. for one hour to obtain an interesterified oil. From the interesterified oil, a high melting point fraction (yield: 20.1%) and then a low melting point fraction (yield: 45.1%) were removed by using hexane to obtain a middle melting point fraction (hereinafter referred to as mid-fraction) (yield: 34.8%) as the desired anti-blooming agent. The fatty acid composition and triglyceride composition of the interesterification oil and the mid-fraction obtained therefrom are shown in Table 1. In Table 1, regardless of the description of the claims hereinafter, the symbols S3, S2U, SU2 and U3 and the analytical method are those according to "Oil Chemistry", 34(1), 36–41 (1985), and SSU and SUS are the ratio of the symmetrical glycerides and asymmetrical glycerides of S2U calculated by separation utilizing TLC with silver nitrate treatment and analysis with a densitometer.

TABLE 1

| Fatty acid composition | $C_{16}$ | $C_{18}$ | $C_{18}F_1$ | $C_{18}F_2$ | $C_{20}$ | $C_{22}$ |
|---|---|---|---|---|---|---|
| Interesterified oil | 7.0 | 46.1 | 41.0 | 4.7 | 0.5 | 0.7 |
| Mid-fraction | 6.6 | 54.1 | 34.0 | 3.9 | 0.6 | 0.8 |

| Triglyceride composition | S3 | S2U (SSU + SUS) | SU2 + U3 |
|---|---|---|---|
| Interesterified oil | 15.1 | 24.1 + 13.2 | 47.6 |

TABLE 1-continued

| Mid-fraction | 3.0 | 50.9 + 25.5 | 20.6 |

EXAMPLE 2

According to the same manner as described in Example 1, the desired mid-fraction was obtained in the yield of 35% except that the mixture of extremely hydrogenated soy bean-oil (I.V.: 0.59), high oleic sunflower oil and extremely hydrogenated rapeseed oil (I.V.: 0.73) in the ratio of 4:5:1 (in the case of Comparative Example, 0:5:5) was used. The fatty acid composition of the mid-fraction is shown in Table 2.

TABLE 2

|  | $C_{14}$ | $C_{18}$ | $C_{18}F_1$ | $C_{18}F_2$ | $C_{20}$ | $C_{18}F_3$ | $C_{22}$ | $C_{22}F_1$ | $C_{24}$ |
|---|---|---|---|---|---|---|---|---|---|
| Example 2 | 6.0 | 48.1 | 34.6 | 3.8 | 1.3 | 0.2 | 5.7 | — | 0.3 |
| Comparative Example | 4.2 | 20.9 | 31.2 | 3.0 | 5.8 | 28.2 | 28.2 | 0.5 | 0.9 |

EXAMPLE 3

A chocolate mix (total oil content: about 34%) was prepared by admixing cacao mass (23 parts), cocoa powder (12 parts), powdered sugar (45 parts) and cacao butter (20 parts) (Control, i.e., no anti-blooming agent), or by admixing cacao mass (23 parts), cocoa powder (12 parts), powdered sugar (45 parts) and cacao butter in which, as the anti-blooming agent, one of the mid-fractions obtained in Examples 1 and 2 and the Comparative Example was molten in the amount corresponding to 8% of cacao butter (20 parts). After tempering, the chocolate mix was cast in a mold, cooled at 5° C. for 30 minutes, released from the mold and aged at 20° C. for a week to obtain chocolate.

The resulting chocolate was allowed to stand at 17° C. for 11.5 hours and then at 32° C. for 11.5 hours (heat-up time and cool-down time were 30 minutes, respectively). This cycle was repeated and the number of cycles necessary for producing bloom was recorded. The number of cycles, the viscosity of the chocolate mix before casting in the mold and mouth feel of the chocolate immediately after aging are shown in Table 3.

TABLE 3

| Anti-blooming agent | Days necessary for producing bloom | Viscosity (poise) | Mouth feel (melting in the mouth) |
|---|---|---|---|
| no (Control) | 2 | 340 | excellent |
| Example 1 | 9 | 345 | excellent |
| Example 2 | 8 | 350 | good |
| Comparative Example | 9 | 410 | slightly bad |

EXAMPLE 4

A substrate containing extremely hydrogenated rapeseed oil (I.V.: 0.48) and fatty acid ethyl esters rich in ethyl oleate in the ratio of 4:6 was subjected to interesterification by using lipase having selectivity to the 1- and 3-positions of triglycerides to obtain an interesterified oil. The resulting oil was further fractionated by using hexane to obtain a mid-fraction (fractionation yield: 38.9%). The fatty acid composition and triglyceride composition of raw material, interesterified oil and mid-fraction are shown in Table 4 below.

TABLE 4

| Fatty acid composition | $C_{16}$ | $C_{16}F_1$ | $C_{17}$ | $C_{18}$ | $C_{18}F_1$ | $C_{18}F_2$ | $C_{20}$ | $C_{18}F_3$ | $C_{22}$ |
|---|---|---|---|---|---|---|---|---|---|
| Extremely hydrogenated Fat | 4.0 | — | — | 98.1 | — | — | 1.9 | — | 1.0 |
| Ethyl ester | 3.2 | 5.4 | 1.2 | — | 85.6 | 3.8 | 0.4 | 0.4 | 0.2 |
| Interesterified oil | 3.2 | 2.6 | 0.5 | 53.7 | 36.5 | 2.4 | 0.7 | 0.4 | — |
| Mid-fraction | 3.5 | 2.0 | 0.5 | 59.4 | 31.3 | 1.9 | 1.1 | 0.3 | — |

| Triglyceride composition | S3 | (SSU + SUS) | SU2 + U3 |
|---|---|---|---|
| Interesterified oil | 13.9 | 44.9 + 0.9 | 40.3 |
| Mid-fraction | 1.6 | 79.0 + 1.6 | 17.9 |

EXAMPLE 5

According to the same manner as described in Example 4, the mid-fraction was obtained by interesterification except that palm oil whose high melting point fraction was removed was highly hydrogenated (I.V.: 0.12) and the resulting fat was used in place of the extremely hydrogenated rapeseed oil. The fatty acid composition and triglyceride composition of the fraction are shown in Table 5 below.

TABLE 5

| Fatty acid composition | $C_{14}$ | $C_{16}$ | $C_{16}F_1$ | $C_{17}$ | $C_{18}$ | $C_{18}F_1$ | $C_{18}F_2$ | $C_{20}$ | $C_{18}F_2$ |
|---|---|---|---|---|---|---|---|---|---|
|  | 2.4 | 21.5 | 3.7 | 0.6 | 36.4 | 31.8 | 1.6 | 0.2 | 0.8 |

| Triglyceride composition | S3 | (SSU + SUS) | SU2 + U3 |
|---|---|---|---|
|  | 3.7 | 76.8 ± 3.2 | 16.3 |

EXAMPLE 6

Ethyl caprinate (first class grade chemical, 4 parts) was mixed with extremely hydrogenated soybean oil (1 part) and the mixture was subjected to interesterification by using lipase having selectivity to the 1- and 3-positions of triglycerides. Then, the ethyl ester was removed from the interesterified oil and the oil was subjected to molecular distillation to separate into a fly portion and a fractionated residue (75:25). The triglyceride composition of the residue is XStX (wherein X is capric acid residue and St is stearic acid residue): 11.5%, StStX: 79.6% and StStSt: 8.9%.

EXAMPLE 7

According to the same manner as described in Example 3, chocolate was produced except that the blooming agent of Example 1, 4, 5 or 7 (Example 1a was the interesterified oil and Example 1b was the mid-fraction) was used and the weight ratio thereof to the amount of cacao butter was adjusted to 3 to 10%. The resulting chocolate was allowed to stand at 17° C. for 11.5 hours and then at 32° C. for 11.5 hours (heat-up time and cool-down time were 30 minutes, respectively, Condition A) or allowed to stand at 17° C. for 2.5 hours and then at 30.5° C. for 2.5 hours (Condition B). These cycles were repeated, respectively and the number of cycles necessary for producing bloom was recorded. The results are shown in Table 7.

In Table 7, each figure in the parentheses of the eight ratio is the increment of SSU content (%) in the fat component of the chocolate.

TABLE 7

| Anti-blooming agent | Weight ratio | Condition (A) | Condition (B) |
|---|---|---|---|
| (1) Control | 0% (0.0) | 2 | 28 |
| (2) Example 1a | 10% (1.4) | 4 | 75 |
| (3) Example 1b | 3% (0.9) | 2 | 31 |
| (4) Example 1b | 5% (1.5) | 4 | 80 |
| (5) Example 1b | 8% (2.4) | 9 | 120 |
| (6) Example 1b | 10% (3.0) | 12 | 152 |
| (7) Example 4 | 5% (2.3) | 5 | — |
| (8) Example 4 | 8% (3.7) | 11 | — |
| (9) Example 4 | 10% (4.7) | 15 | — |
| (10) Example 5 | 5% (2.3) | 4 | 40 |
| (11) Example 5 | 8% (3.6) | 7 | 185 |
| (12) Example 5 | 10% (4.5) | 9 | ≧200 |
| (13) Example 6 | 5% (2.3) | 4 | — |
| (14) Example 6 | 8% (3.6) | 6 | — |
| (15) Example 6 | 10% (4.5) | 9 | — |

As is clear from Table 7, as the degree of increment of SSU content in the fat component of the chocolate becomes higher, the effect of prevention of blooming is more enhanced. Thus, such effect can not be obtained in No. 3 in which the degree of increment of SSU content is low. In Nos. 2 and 4 where the degrees of increment of SSU content are almost the same, their effects of prevention of blooming are almost the same. However, in No. 2, increase in viscosity during tempering is high because the amount of trisaturated triglycerides in the anti-blooming agent is too large and therefore workability becomes slightly bad, and the product has slightly sticky mouth feel because of too much diunsaturated-monosaturated triglycerides and triunsaturated trigycerides. In No. 4, these disadvantages of workability and mouth feel of the product are not observed.

EXAMPLE 8

According to the same manner as described in Example 3, chocolate was produced except that a commercially available tempering type hard butter ("New SS-7" manufactured by Fuji Oil Co., Ltd., 20 parts) was used in place of cacao butter (20 parts) and the molten anti-blooming agent of Example 1b (mid-fraction) was admixed. The resulting product has excellent mouth feel as well as bloom resistance (11 cycles under Condition A and 180 cycles under Condition B).

EXAMPLE 9

A chocolate mix was produced by admixing cacao mass (20 parts), powdered sugar (45 parts), whole milk powder (14 parts), and a commercially available no tempering type hard butter ("Merano-STS" manufactured by Fuji Oil Co., Ltd., 21 parts). Then, the molten anti-blooming agent of Example 1b was added to the mix in an amount corresponding to 8% of the hard butter. The mixture was cast in a mold, cooled at 5° C. for 30 minutes, released from the mold and aged at 20° C. for a week to obtain chocolate.

The chocolate had excellent bloom resistance.

EXAMPLE 10

A chocolate mix (total oil content: about 23%) was prepared by admixing cacao mass (23 parts), cacao powder (12 parts), powdered sugar (45 parts), cacao butter (10 parts) and the commercially available tempering type hard butter as described in Example 8 (10 parts) (Control, i.e., no anti-blooming agent), or by admixing cacao mass (23 parts), cacao powder (12 parts), powdered sugar (45 parts), cacao butter (10 parts) and a hard butter (10 parts) obtained by mixing the commercially available tempering type hard butter as described in Example 8 with one half or one quarter of the anti-blooming agent of Example 1b. After tempering, the chocolate mix was cast in a mold, cooled at 5° C. for 30 minutes, released from the mold and aged at 20° C. for a week to obtain chocolate.

The resulting chocolate was allowed to stand at 17° C. for 11.5 hours and then at 32° C. for 11.5 hours (heat-up time and cool-down time were 30 minutes, respectively, Condition A), or allowed to stand at 17° C. for 11.5 hours and then at 35° C. for 11.5 hours (heat-up time and cool-down time were 30 minutes, respectively, Condition C). These cycles were repeated and the number of days necessary for producing blooming was recorded. The results are shown in Table 8. In Table 8, each figure in the parentheses of the weight ratio is the increment of SSU content (%) in the fat component of the chocolate.

TABLE 8

| Amount of anti-blooming agent | Condition A (days) | Condition C (days) | Mouth feel (melting in mouth) |
| --- | --- | --- | --- |
| 0 (Control) | 2 | 1 | good |
| 25% (3.75) | 18 | 8 | good |
| 50% (7.49) | 52 | 15 | good |

What is claimed is:

1. A process for producing a hard butter which comprises
   providing an anti-blooming agent which comprises not less than 40% by weight of mono-U-di-S glycerides (SSU) and not more than 30% by weight of mono-S-di-U and tri-U glycerides in total, wherein U is a fatty acid residue having a melting point as the corresponding free fatty acid of not higher than 40° C. and bonded to the 1- or 3-position of the glyceride, and S is a saturated fatty acid residue having a melting point of not lower than 45° C. and bonded to the remaining positions, and not less than 75% by weight of all S in said SSU being a stearic acid residue or palmitic acid residue, and
   admixing the anti-blooming agent with other raw materials for the hard butter to raise the SSU content of the hard butter by not less than 2.0% by weight.

2. A process according to claim 1, wherein the SSU content is raised by 4 to 25% by weight.

3. A process according to claim 1, wherein the SSU content is raised by 6 to 25% by weight.

4. A process for producing a hard butter product which comprises
   providing an anti-blooming agent which comprises not less than 40% by weight of mono-U-di-S glycerides (SSU) and not more than 30% by weight of mono-S-di-U and tri-U glycerides in total, wherein U is a fatty acid residue having a melting point as the corresponding free fatty acid of not higher than 40° C. and bonded to the 1- or 3-position of the glyceride, and S is a saturated fatty acid residue having a melting point of not lower than 45° C. and bonded to the remaining positions, and not less than 75% by weight of all S in said SSU being a stearic acid residue or palmitic acid residue, and
   admixing the anti-blooming agent or a hard butter containing it with other raw materials for the hard butter to raise the SSU content in the fat component of the hard butter product by not less than 1.2% by weight.

5. A process according to claim 4, wherein the SSU content is raised by 2.5 to 7.5% by weight.

6. A process according to claim 4, wherein the SSU content is raised by 3.5 to 7.5% by weight.

* * * * *